July 5, 1927.

E. C. SOLA 1,634,597

APPARATUS FOR CINEMATOGRAPHIC PROJECTIONS

Filed Dec. 24, 1924   2 Sheets-Sheet 1

Inventor
E. C. Sola
By Marks Clerk

July 5, 1927.
E. C. SOLA
1,634,597
APPARATUS FOR CINEMATOGRAPHIC PROJECTIONS
Filed Dec. 24, 1924   2 Sheets-Sheet 2
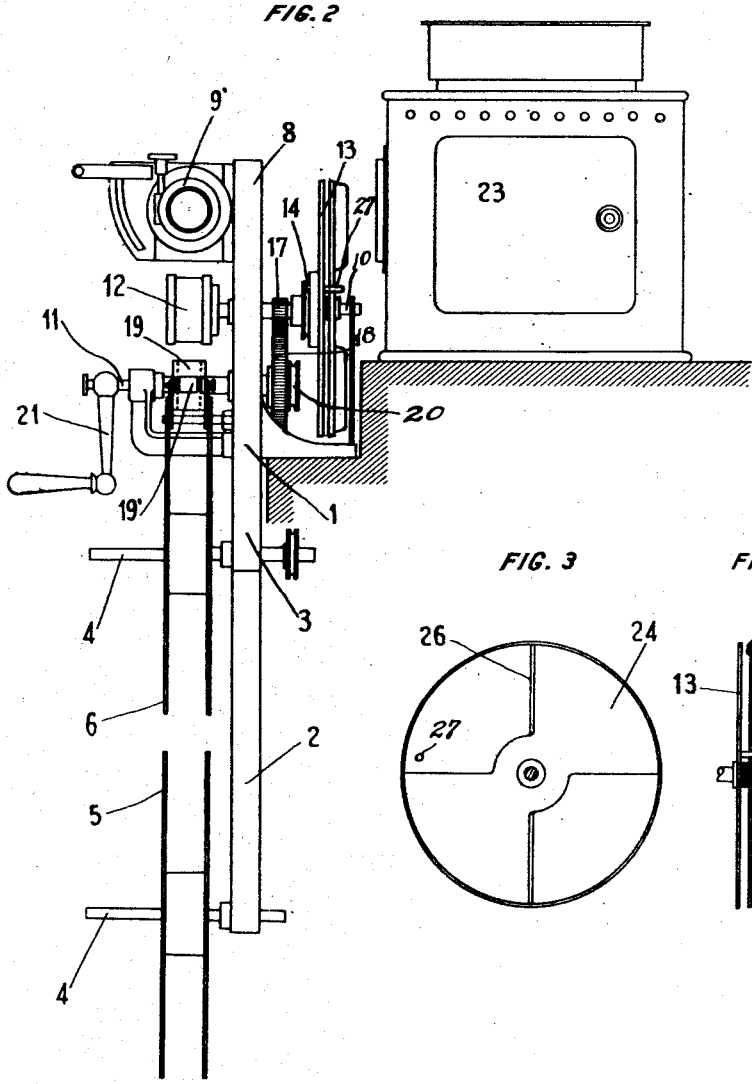

Patented July 5, 1927.

UNITED STATES PATENT OFFICE.

EMILIO CARRANZA SOLÁ, OF FLIX, SPAIN.

APPARATUS FOR CINEMATOGRAPHIC PROJECTIONS.

Application filed December 24, 1924, Serial No. 757,944, and in Spain January 11, 1924.

This specification relates to a patent of invention intended to secure the ownership and exclusive exploitation of a new apparatus for cinematographic projection.

The apparatus is characterized essentially by its simplicity in operation and the fewness of its parts which enables the apparatus to be constructed at low cost.

Moreover, by means of this apparatus, clear, steady and very distinct images are projected upon the screen, use being made of members for changing the images of the film with great rapidity, at the same time as the light is shut off from the film for a very brief period, the value of which is equal to the intermediate obturation or eclipse of each image, the said obturations or eclipses obtained in this manner having an equal value to the periods during which the light passes, a condition which highly favours the obtaining of clear and distinct projections.

The apparatus proper is characterized by the feature that it is arranged in such a manner that the film receives the light indirectly, that is to say that the lantern in which is placed the source or origin of the illumination, is not an integral part of the said apparatus but in this case is arranged separately from the latter and so as to direct the beam of the rays of light which it throws out on to a mirror arranged for this purpose which deflects and directs the rays towards the objective of the projecting apparatus.

Together with this device the said apparatus provides important safeguarding means, so that if any accident occurs to the lantern it will in no case affect the film or any part of the projecting apparatus.

Moreover, the shutter of the apparatus proper is double and is arranged so that when the apparatus is not in motion it remains closed, opening automatically as soon as the apparatus commences to work. In this manner, if for any reason the projecting apparatus ceases to be in motion, the continuous action of the rays of light upon the same part of the film, which would set fire to the latter, is prevented.

One practical form of construction of the apparatus according to the invention is illustrated by way of example, in the accompanying drawings in which:—

Figure 2 is a front view of the same apparatus.

Figures 3 and 4 show to a large scale the shutter with the device for automatically closing its apertures.

Figure 1:
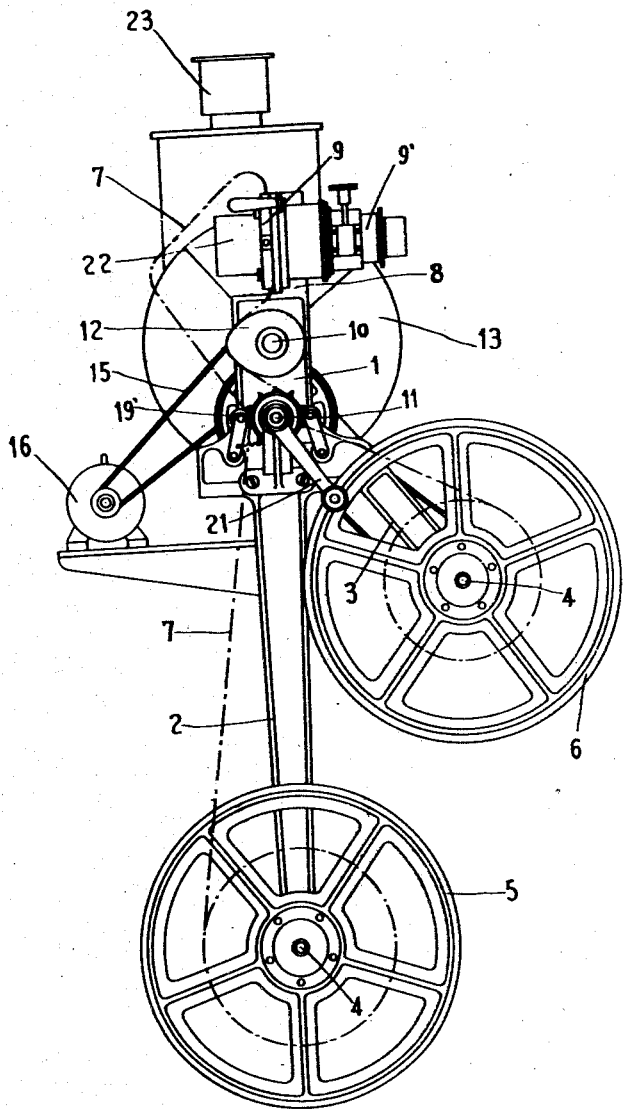
Figure 1 is a side view of the entire apparatus.

This apparatus comprises a frame 1, which is supported upon a suitable pedestal, table or support made of iron, wood or any other suitable material.

This frame is provided with two arms 2 and 3, at the end of which are provided the spindles 4 for carrying the spools or reels 5 and 6 for the film 7. The frame is moreover provided at its upper part with an extension 8, on which is mounted the gate 9 and the projecting objective 9', which may be adjustable and of any class, type or arrangement.

Mounted upon the frame proper 1 are the axles 10 and 11, upon the first of which is mounted so as to form an integral part thereof, member 12 having a curved cam-like surface which when it rotates draws the film 7, as the latter issues from the gate 9 the said member by pulling upon the film, causes the latter to move intermittently. The said cam-like member which rotates at a constant angular velocity is made with a profile so as to give to the film during each intermittent actuation progressive and uniformly accelerated and decelerated movements, thereby preventing any pronounced or jerky action.

Upon the axle proper is also mounted the shutter 13, the pulley 14, over which passes the belt 15, which is driven by an electric motor 16, and a toothed pinion 17 which engages with a wheel 18 mounted upon the axle 11 so as to form an integral part of the latter. Upon this axle is mounted the cylinder or sprocket 19 which guides the film by means of its corresponding jockey rollers 19', and the pulley 20 for transmitting motion to the spindle of the spool or reel 6, upon which the film is wound after it has passed through the gate 9 and over the cylinder 19.

Upon the end of the axle proper 11 is provided an operating handle 21 for the purpose of actuating the apparatus by hand in case of necessity.

The apparatus described is completed by a mirror 22 placed in front of the gate aperture 9 and at an inclination of 45° thereto, upon which mirror the luminous rays from a source of illumination placed within the lantern 23, impinge, the rays being deflected by the said mirror and directed to the objective 9'. The shutter 13 is integrally mounted upon its shaft 10 and at a suitable distance from it is mounted freely upon the same shaft a second shutter 24 (see also Figures 3 and 4) of the same size as the shutter 13 and connected to the latter by means of a spring 25 in such a manner that when the shutter 13 is stationary its apertures are always covered by the second shutter 24. The latter is provided with radial wings or projections 26 and when the first shutter is put in motion, the action of the air upon the said wings of the shutter 24 imparts a backward movement to the latter, this movement being limited by a stop 27 provided for the purpose, when the apertures of the two shutters coincide. In the same way, when the shutter 13 stops the spring 25 acts upon the shutter 24 and automatically brings it back to its original position.

The sizes and shapes of the various parts or members which constitute the apparatus, as well as the materials from which the said members are constructed, and also the general construction of the apparatus may be varied without going outside the scope of the invention.

What I claim is:—

An apparatus for cinematographic projection, comprising a frame, supporting members thereon for supporting the spindles of the film spools, the projecting gate and the objective, an axle mounted on the said frame, a motor for driving the said axle, a shutter mounted on the said axle in an integral manner, a second axle, a device mounted on the first axle for transmitting motion to said second axle of the apparatus, a cam member having constant angular rotation mounted on the first axle and having a profile such that the film is given progressive uniformly accelerated and decelerated movements during each intermittent actuation, a member integrally mounted on the second axle driven by the first axle, a member integrally mounted on the second axle for driving the spool upon which the film is being wound, a sprocket upon the second axle for guiding the film, which sprocket is provided with the corresponding jockey rollers.

In testimony whereof I have signed my name to this specification.

EMILIO CARRANZA SOLÁ.